(12) United States Patent
Rychener

(10) Patent No.: US 8,117,205 B2
(45) Date of Patent: Feb. 14, 2012

(54) TECHNIQUE FOR ENHANCING A SET OF WEBSITE BOOKMARKS BY FINDING RELATED BOOKMARKS BASED ON A LATENT SIMILARITY METRIC

(75) Inventor: Michael D. Rychener, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 704 days.

(21) Appl. No.: 12/169,360

(22) Filed: Jul. 8, 2008

(65) Prior Publication Data

US 2010/0010981 A1  Jan. 14, 2010

(51) Int. Cl.
*G06F 17/30* (2006.01)
(52) U.S. Cl. ........................ 707/739; 707/748
(58) Field of Classification Search .................. 707/739, 707/748
See application file for complete search history.

(56) References Cited

U.S. PATENT DOCUMENTS

| 6,212,522 | B1 | 4/2001 | Himmel et al. | |
| 6,470,307 | B1 * | 10/2002 | Turney | 704/9 |
| 6,493,702 | B1 | 12/2002 | Adar et al. | |
| 6,741,979 | B1 * | 5/2004 | Tiahrt | 1/1 |
| 7,181,438 | B1 * | 2/2007 | Szabo | 1/1 |
| 7,254,576 | B1 | 8/2007 | Hamilton | |
| 2007/0300295 | A1 | 12/2007 | Kwok et al. | |

FOREIGN PATENT DOCUMENTS

WO  WO2007106148  9/2007

OTHER PUBLICATIONS

"Technique for Ordering Search Results Using Personalized Context"; IP.com Prior Art Database Technical Disclosure; Jul. 2, 2007; IP.com, Inc.
Benz, Dominik et al., "Automatic Bookmark Classification: A Collaborative Approach"; Computer-based New Media Group, WWW2006, May 22-26, 2006, 8 pages, Edinburgh, U.K.
Byde, Andrew, et al.; "Personalized Tag Recommendations Via Tagging and Content-based Similarity Metrics", 2 pages, (Mar. 2007).

* cited by examiner

*Primary Examiner* — Son T Hoang
(74) *Attorney, Agent, or Firm* — Suiter Swantz pc llo

(57) ABSTRACT

A method and system for enhancing the quality of a bookmark or a set of bookmarks that have been organized by topic and contain information related to that topic. The method and system analyzes documents accessible by the bookmark or set of bookmarks and performs a search using key terms from that analysis in a vector called a latent similarity metric. The terms that result from this search are preferably ranked in a hierarchy or the like and utilized in a subsequent search to locate and rank additional related documents.

1 Claim, 4 Drawing Sheets

TECHNIQUE FOR ENHANCING A SET OF WEBSITE BOOKMARKS BY FINDING RELATED BOOKMARKS BASED ON A LATENT SIMILARITY METRIC

TECHNICAL FIELD

The present disclosure generally relates to the field of bookmarking, and more particularly to improved method of organizing bookmarks.

BACKGROUND

A user interested in a particular topic will often bookmark websites according to subject matter or the like. These bookmarks allow a user to readily return to a given website since each bookmark is generally associated with a Universal Resource Locator (URL) or the like. Most browsers offer an opportunity to organize bookmarks into folders, thus, allowing a user to monitor or access related sites. A given set of bookmarks may or may not include all of the information desired by a user. Additionally, studying existing bookmarked sites may lead to questions not covered directly covered (addressed) within a given set of bookmarks. In either of these cases, the user needs to find additional related sites on the topic. Finding more sites to fit into the set might require examining long lists of search results. A technique to extend the set automatically, thereby enhancing it, would be useful in this situation.

SUMMARY

An embodiment of the present invention analyzes similarities among a set of existing bookmarked web sites and performs a search using key terms from that analysis. The search results obtained from the initial search from using those terms for a new search are evaluated by using similarities between the new results and the existing set. New results with the best semantic similarity to the existing set can be used to extend the existing set of bookmarks.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawing.

An embodiment of the present invention may be described as having three primary main steps. These steps presuppose the existence of a set B of bookmarks (URLs) on a topic of interest. The steps are: (1) analysis for similarities, (2) extraction of new search terms, and (3) selection from the results of a new search based on those new search terms.

(1) Analysis of similarities. A sampling of text is made from each web site bookmarked within sample bookmark set B. Each sample of text is scanned to produce a list of key words and a weighting number on each word. Preferably, the scanning process includes removal of "stop" words and a simple stemming procedure to remove common word endings. Additionally, the analysis is made more efficient by removing low-frequency items, e.g., by trimming the output rank vector. Analysis of set B will produce a vector S word list.

(2) Extraction of new search terms. The top words from vector S form a new set of search terms. In a preferred embodiment, vector S contains words with endings and prefixes removed (by "stemming" rules); the stems can then be expanded back to their original word form. This produces a search word list (search 1) for presentation to a search engine. The search engine results based on search 1 produces a set of documents (set C).

(3) Sorting results of new search. Each result from set C is given a weight, e.g., by evaluating it with similarity vector S. That is, a sample of text is retrieved from the result's site; then the sample is scanned and weighted using vector S. Results that are already in the initial set B are excluded. The top results according to this weighting become the new enhancements to the set B.

Figure 1:
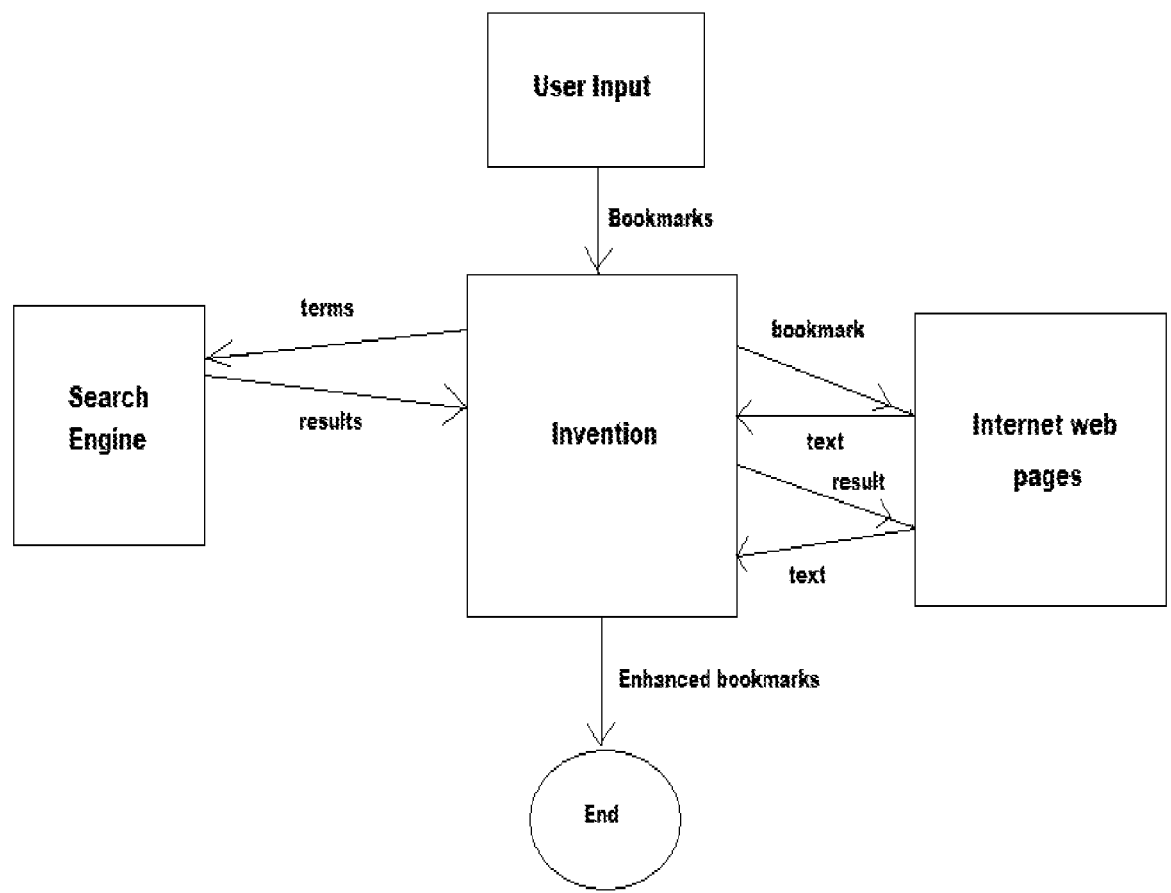
FIG. 1 is a flow diagram illustrating the operating environment of the present invention.

FIG. 1 illustrates the overall operating environment of the present invention. A user may input bookmarks such that the invention creates search terms for searching for results related to the search terms. The invention may then refine the search terms via a ranking and normalization method before conducting a refined search for producing a list of enhanced bookmarks related to the original bookmark.

Figure 2:
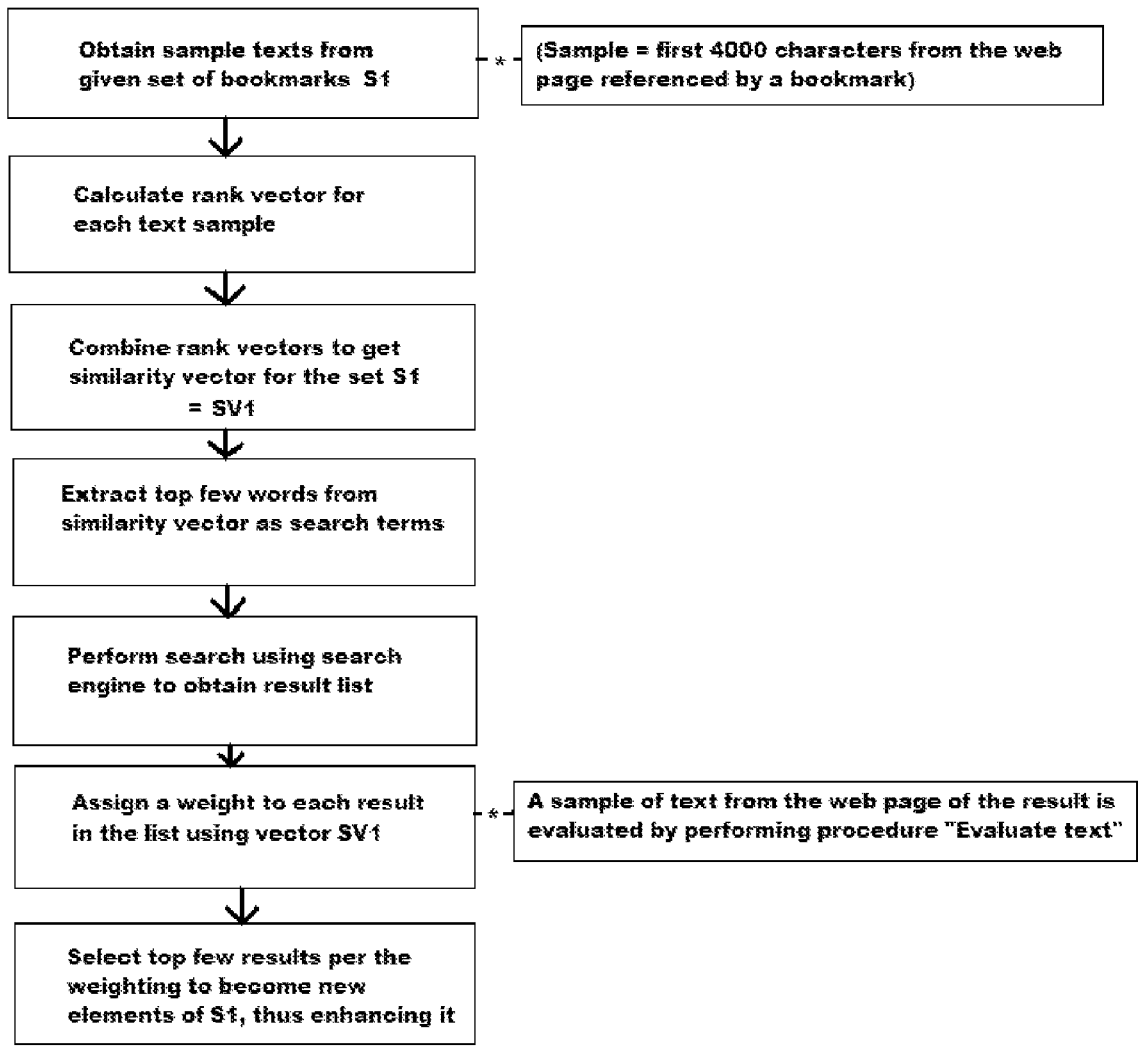
FIG. 2 is a flow diagram illustrating the primary steps of a method of the present invention.

FIG. 2 illustrates the primary steps of a preferred embodiment of the present invention. The invention first samples text from a bookmark or a set of bookmarks. Next the invention calculates a rank vector for each text sample. The invention then combines rank vectors in order to obtain a similarity vector. The top few words are extracted from the similarity vector for use as a search term or phrase. The invention then performs a search utilizing standard INTERNET search engines. The search results are listed by weight. This process may be repeated. The result is a set of bookmarks related to the original bookmarks.

Figure 3:
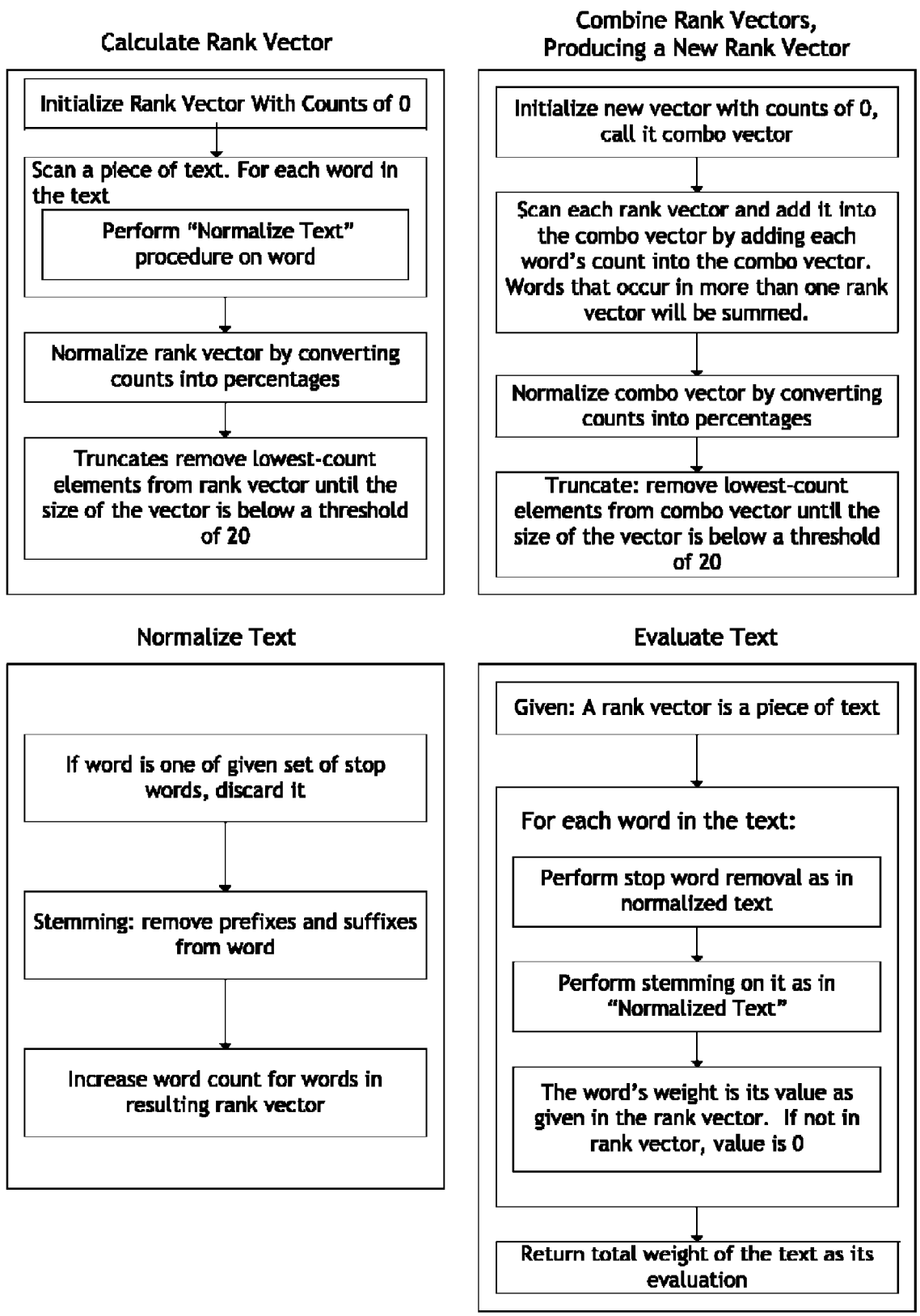
FIG. 3 is a flow diagram illustrating the currently preferred method of normalizing the search text of the present invention.

FIG. 3 illustrates a preferred normalization technique for calculating rank vectors, producing new rank vectors, evaluating text, and normalizing text. Normalization removes all stop words and any prefixes and suffixes from any remaining words (non-stop words). A word count is then made. Rank vectors are then created word ranks are evaluated.

Figure 4:
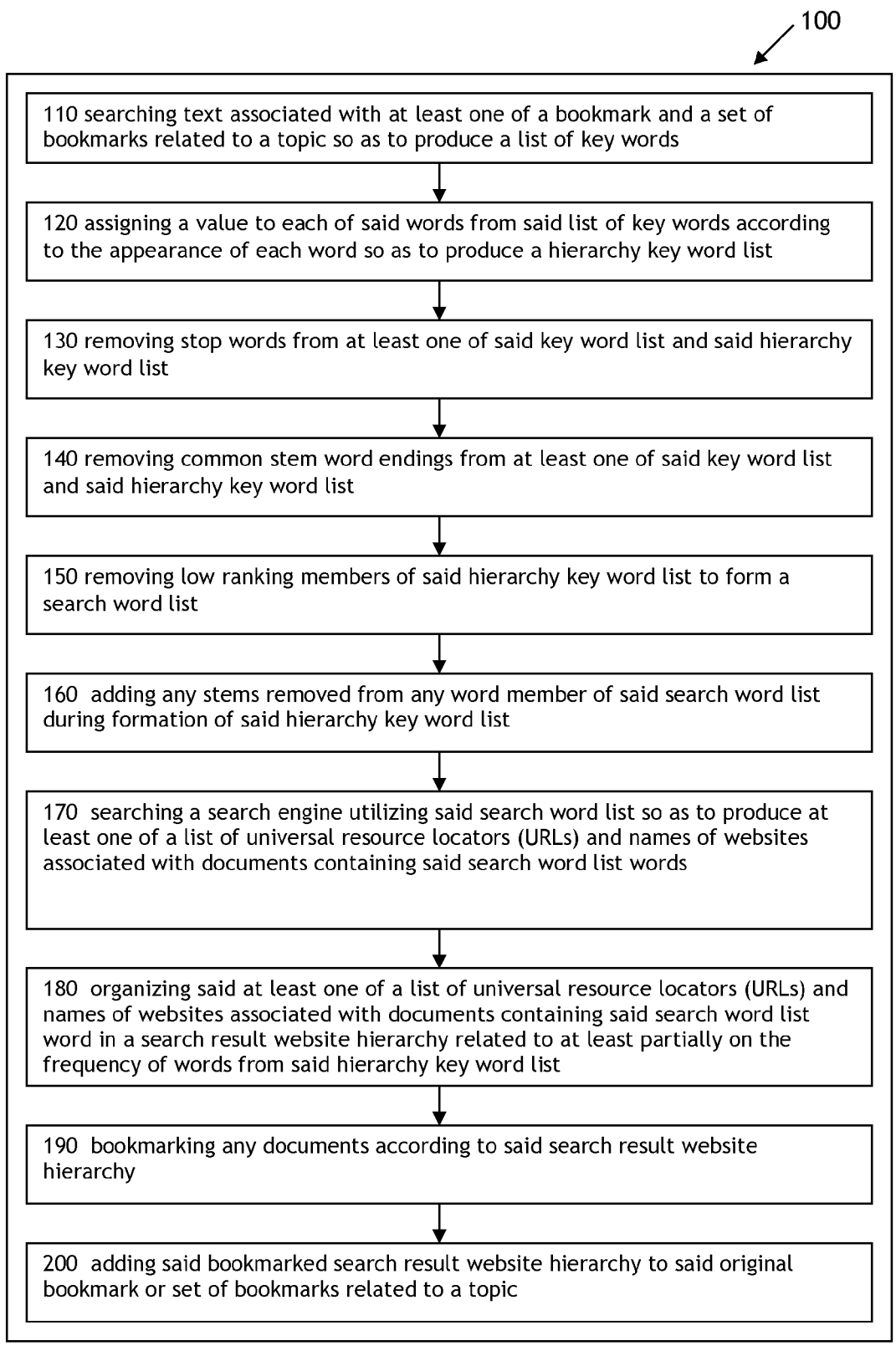
FIG. 4 is a flow diagram illustrating an embodiment of the bookmark enhancement of the present invention.

FIG. 4 illustrates another operational embodiment of the present invention. The steps comprise searching text associated with at least one of a bookmark and a set of bookmarks related to a topic so as to produce a list of key words (Step 110), assigning a value to each of said words from said list of key words according to the appearance of each word so as to produce a hierarchy key word list (Step 120), removing stop words from at least one of said key word list and said hierarchy key word list (Step 130), removing common stem word endings from at least one of said key word list and said hierarchy key word list (Step 140), removing low ranking members of said hierarchy key word list to form a search word list (Step 150), adding any stems removed from any word member of said search word list during formation of said hierarchy key word list (Step 160), searching a search engine utilizing said search word list so as to produce at least one of a list of universal resource locators (URLs) and names of websites associated with documents containing said search word list words (Step 170), organizing said at least one of a list of universal resource locators (URLs) and names of websites associated with documents containing said search word list word in a search result website hierarchy related to at least partially on the frequency of words from said hierarchy key word list (Step 180), bookmarking any documents according to said search result website hierarchy (Step 190), and adding said bookmarked search result website hierarchy to said original bookmark or set of bookmarks related to a topic (Step 200).

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claim to encompass and include such changes.

What is claimed is:

1. A method for enhancing at least one of an original bookmark and a set of bookmarks related to a topic, performed by a computer processor executing computer usable program code, comprising:

searching textual contents associated with at least one of said original bookmark and said set of bookmarks related to said topic to produce a key-word list comprising a plurality of key-words;

assigning a value to each of said plurality of key-words from said list of key-words according to an appearance of each of said key-words to produce a hierarchy key-word list comprising ranked key-words based on said assigned values;

removing stop words from at least one of said key-word list and said hierarchy key-word list;

removing common word-ending stems of said key-words or said ranked key-words from at least one of said key-word list and said hierarchy key-word list;

removing low ranking key-words from said hierarchy key-word list to form a search-word list;

adding any stems removed from any of said key-words during formation of said hierarchy key-word list to said search-word list to form word members of said search-word list;

executing a search with a search engine utilizing said search-word list to produce at least one of a list of universal resource locators (URLs) and names of websites associated with documents containing word members of said search-word list;

organizing said at least one of said list of URLs and said names of websites in a search result website hierarchy related to at least partially a frequency of said ranked key-words from said hierarchy key-word list;

bookmarking any of said documents according to said search result website hierarchy; and adding said bookmarked documents to said original bookmark or said set of bookmarks related to said topic.

* * * * *